United States Patent [19]

Hyde

[11] 4,399,246

[45] Aug. 16, 1983

[54] FILLED POLYAMIDE COMPOSITIONS WITH SILANES AND SULFONAMIDES

[75] Inventor: Thomas J. Hyde, Wilmington, Del.

[73] Assignee: E. I. Du Pont de Nemours & Co., Wilmington, Del.

[21] Appl. No.: 405,760

[22] Filed: Aug. 6, 1982

[51] Int. Cl.$^3$ .............................................. C08L 77/06
[52] U.S. Cl. .................................... 524/169; 524/445; 524/451; 524/456; 524/606
[58] Field of Search ................................. 524/169, 606

[56] References Cited

U.S. PATENT DOCUMENTS

| | | | |
|---|---|---|---|
| 2,214,405 | 9/1940 | Coffman | 260/33 |
| 2,757,156 | 7/1956 | Dazzi | 260/30.8 |
| 3,419,517 | 12/1968 | Hedrick et al. | 260/37 |
| 3,843,591 | 10/1974 | Hedrick et al. | 524/606 |
| 4,080,347 | 3/1978 | Hefele | 524/169 |

FOREIGN PATENT DOCUMENTS 54-22457  2/1979  Japan .................................... 524/606

Primary Examiner—Lewis T. Jacobs

[57] ABSTRACT

This invention is directed to a composition of matter which is derived from 50 to 75 parts of polyamide resin with a number average molecular weight of at least 11,000, plus 25 to 50 parts of a selected mineral filler, 0.2 to 0.9 parts of aminofunctional silane, and 0.2 to 0.9 parts of a selected sulfonamide. The composition provides molded parts with significantly improved falling-weight impact resistance at no sacrifice of rigidity under a wide variety of processing conditions.

11 Claims, No Drawings

FILLED POLYAMIDE COMPOSITIONS WITH SILANES AND SULFONAMIDES

FIELD OF THE INVENTION

This invention is directed to a plastic material, and more particularly to a polyamide resin containing mineral filler, aminofunctional silane, and a selected sulfonamide. The composition provides molded parts with significantly improved impact resistance than compositions not containing the sulfonamide at no sacrifice of rigidity under a wide variety of processing conditions.

BACKGROUND OF THE INVENTION

Polyamide (i.e. nylon) resin reinforced with mineral filler and small amounts, e.g. about 0.5%, of silane coupling agent can be molded into parts which exhibit improved stiffness when compared with the properties of the unmodified nylon resin. Suitable silanes are described in the prior art, for example, U.S. Pat. No. 3,290,165 discloses the use of gamma aminopropyltriethoxysilane as a coupling agent. Examples of mineral filler nylon resin are provided in U.S. Pat. No. 3,419,517. However, the falling-weight impact resistance of mineral filled nylon resin is inferior to that of the parent nylon resin which does not contain filler. To overcome this deficiency, the impact resistance of filled nylon resins has been improved by the use of a blend of nylon-6 and nylon-66 (see for example, U.S. Pat. No. 3,846,367) or by the use of toughening polymers with low modulus (see for example, U.S. Pat. No. 4,174,358). However, molded parts derived therefrom showed an undesirable sacrifice of stiffness as measured by flexural modulus when subjected to humid environments. It is an object of this invention to improve the impact resistance of mineral filled nylon resin without sacrificing the modulus of a specified polyamide matrix.

Ordinarily the dispersion of a high concentration of mineral filler into a polyamide matrix requires the use of heavy compounding equipment, such as a continuous mixer based on the principle of the Banbury mill with counter-rotating blades, or a twin screw extruder with co-rotating, intermeshing screws. It would be desirable to use a simple single screw extruder to attain a uniform dispersion of filler in polyamide, in order to reduce the capital investment of this processing step. With a single screw extruder, the capital investment per unit weight of product per year is about one-half that of a twin screw extruder. Therefore it is a further objective of this invention to provide a composition that will yield a uniform dispersion by compounding on a simple single screw extruder.

A physical test commonly employed to judge the degree of a given dispersion of filler in polyamide is the falling-weight impact test (ASTM D-3029) on specimens molded from the filled composition. If agglomerates of filler are present, they will act as stress risers in the molded specimen, and the impact resistance will be lowered. On the other hand, if the dispersion of filler is uniform on a microscopic level, this fact will be demonstrated by material with essentially equivalent impact resistance, whether the given composition is derived from a single screw extruder or from heavy compounding equipment.

The use of sulfonamides as plasticizers for nylon is disclosed in U.S. Pat. Nos. 2,214,405 and 2,757,156. Neither patent refers to mineral filled nylon. It is well known that when a sufficient concentration of sulfonamide is present to act as a plasticizer for the polyamide, both the tensile strength and modulus decline. Thus there is a serious compromise between improved toughness and loss of rigidity in the molded part.

SUMMARY OF THE INVENTION

In the present invention, the combined use of a surprisingly small amount of sulfonamide plus an aminofunctional silane were found to improve impact resistance of mineral filled polyamides to a significantly greater extent than the use of either additive alone. The small amount of sulfonamide employed does not depress the flexural modulus of the mineral filled polyamides.

Specifically, this invention comprises a composition consisting essentially of
(a) about 50 to 80 parts by weight of at least one polyamide having a number average molecular weight of at least 11,000,
(b) about 20 to 50 parts by weight of at least one mineral filler that is substantially anhydrous and has a mean average particle size of 2.0 micrometers or less,
(c) about 0.2 to 0.9 parts by weight of at least one aminofunctional silane, and
(d) about 0.2 to 0.9 parts by weight of at least one N-substituted hydrocarbyl sulfonamide,
wherein the parts by weight are based on total composition.

In a preferred case, only 0.60 parts sulfonamide and 0.60 parts aminofunctional silane are employed per 100 parts of mineral filled polyamide to yield molded parts with significantly higher impact resistance than that obtained with either additive alone. With the preferred composition, adequate dispersion of the filler (which is a prerequisite for attaining molded parts with good impact resistance) can be attained by blending the composition on a 2.5" single screw extruder. In contrast, prior art compositions required heavier working equipment, such as a continuous mixer based on the principle of the Banbury mill, or a twin-screw extruder.

DESCRIPTION OF THE INVENTION

The polyamide matrix resin of the compositions of this invention is well known in the art and embraces those semi-crystalline and amorphous resins having a number average molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606, and 3,393,210. Preferably, the polyamide is one that is produced by condensation of equimolar amounts of a saturated dicarboxylic acid containing from 4 to 12 carbon atoms with a diamine, in which the diamine contains from 4 to 14 carbon atoms. Preferably both the diacid and diamine are saturated aliphatic diacids and diamines. Excess diamine can be employed to provide an excess of amine and groups over carboxyl end groups in the polyamide. Examples of polyamides include polyhexamethylene adipamide (66 nylon), polyhexamethylene azelamide (69 nylon), polyhexamethylene sebacamide (610 nylon), and polyhexamethylene dodecanoamide (612 nylon), the polyamide produced by ring opening of lactams, i.e., polycaprolactam, polylauryl lactam, poly-11-aminoundecano amide, poly bis(p-aminocyclohexyl) methane dodecanoamide. It is also possible to use in this invention polyamides prepared by the copolymerization of two of the above polymers or terpolymerization of the above polymers or their components, e.g., for example, an adipic, isophthalic acid hexamethylene diamine copolymer. Preferably the polyamides are linear with a melting point in excess of 200° C. Mixtures of polyamides can also be used. Up to 80% by weight of the composition can be composed of polyamide; however, preferred compositions contain from 50 to 75% by weight of polyamide.

Various fillers are effective as reinforcing agents for polyamides. The filler should be substantially anhydrous and should not release substantial amounts of water at the high melt temperature (approximately 300° C.) encountered in the molding of nylon parts. Preferably the abrasiveness of the filler shall not be excessively high, so as to keep the wear on processing equipment at a tolerable level. Also the mean average particle size of the filler should be in the range of 0.2 to 2.0 micrometers (microns) to optimize impact resistance in the molded part. Examples of preferred minerals for use in the invention described herein are calcined clay (aluminum silicate), wollastonite (calcium silicate), and talc (magnesium silicate), either alone or in combination. The most useful concentration of mineral in polyamide is 25 to 50% of the composition by weight.

The aminofunctional silanes used herein act as coupling agents for the polyamides. Preferably the silanes are amino (lower alkyl) tri(lower alkoxy) silanes. "Lower" means the group contains 1–6 carbon atoms. Examples of such silanes include gamma aminopropyltriethoxysilane and N-(2-aminoethyl)-3-aminopropyltrimethoxysilane, $NH_2CH_2CH_2NH(CH_2)_3Si(OCH_3)_3$. Although the mechanism is not completely understood, at least three reactions appear to be involved. The alkoxysilane groups react with water available on the surface of the filler particles to produce silanol groups plus alcohol byproduct. Next, the silanol groups of the coupling agent react with silanol groups on the surface of the filler to produce Si-O-Si covalent bonds. Thirdly a certain percentage of the amino groups of the silanized inorganic surface react with terminal carboxylic acid groups of the polyamide, and to some extent the amine groups interchange with the amide groups of the polyamide chain.

In a given composition there is an optimum concentration of aminofunctional silane which is determined empirically by measurement of the falling-weight impact resistance and other properties of the composition. If insufficient silane is used, the mineral filler does not function as a reinforcing agent. If too high a concentration of silane is used, the molded part becomes brittle, due to the formation of too many crosslinks between mineral and polyamide. For example, in the case of a commercially available calcined clay in polyamide matrix at a 40/60 weight ratio, it has been found that 0.60 parts of gamma aminopropyltriethoxysilane yields molded parts with a near to optimum falling-weight impact resistance, whereas 0.40 parts or 0.80 parts of silane yield parts with lower impact resistance. Depending upon the choice of mineral filler and its concentration, the useful concentration of aminofunctional silane is 0.2 to 0.9 parts per hundred parts of mineral filled polyamide. The falling-weight impact resistance of a mineral filled polyamide can only be improved to a certain extent by the addition of silane coupling agent. The use of additional silane is counterproductive. Other means must be sought to improve the impact resistance still further, such as the use of sulfonamides as described herein.

The N-substituted hydrocarbyl sulfonamides useful in this invention are preferably high boiling liquids, i.e. preferably have boiling points above about 250° C. Examples include N-ethyl ortho-toluenesulfonamide, N-ethyl paratoluenesulfonamide, and N-butyl benzenesulfonamide. As shown in the Examples, surprisingly low concentrations are effective in improving the impact resistance of molded parts.

The preferred sulfonamides have the following structure:

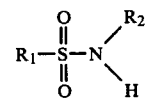

where $R_1$ is aryl of 6–10 carbon atoms and $R_2$ is lower alkyl (containing one to six carbon atoms). The useful concentrations are 0.2 to 0.9 parts per 100 of mineral filled polyamide. Higher concentrations, such as 1.8 parts illustrated in Example 1, did not improve the impact resistance further.

The preferred method of addition is to mix the liquid sulfonamide with the liquid silane, to coat the polyamide particles with this liquid blend, and then to add the mineral particles and mix again. The final mix is extruded, quenched in water, chopped into cubes, and molded into test specimens or useful articles.

The compositions of the invention can be used to mold into articles where good impact resistance is important, such as exterior automotive parts, power tool housings, casings for instruments and the like.

EXAMPLES

The physical tests carried out in the Examples were conducted by the following procedures:
Tensile Strength: ASTM D-638-82
Elongation: ASTM D-638-82
Flexural Modulus: ASTM D-790-81
Falling Weight Impact Resistance: ASTM D-3029 modified as described below
Izod Impact Resistance: ASTM D-256-81

The test specimens molded for the falling-weight impact test had dimensions of 5×3×0.125 inches (127×76×3.2 mm). The impact resistance of the test specimens was measured by a modification of ASTM D-3029. This modification, commonly called the Gardner impact test, uses a constant weight dropped from a variable height. With the impact tester (manufactured by Gardner Laboratory, Bethesda, MD) used herein, a weight of 8.0 lb. (3.6 kg) is released from a selected height through a guide tube and is allowed to strike an impactor on top of the specimen supported on a base plate. As a series of 30 specimens are tested, the height is varied so that approximately half the specimens break and half the specimens remain unbroken. The procedure establishes the energy, in inch-pounds or Joules, which will cause fifty percent of the specimens to fail. The statistical technique for calculation of the results is commonly called the Bruceton staircase method.

For the test apparatus used herein, the diameter of the impactor was 0.50 inch (127 mm) and the diameter of the hole in the base plate was 1.25 inch (31.8 mm). For convenience, the Gardner impact test and equipment used herein will be referred to as falling-weight impact test G.

PREPARATION OF COMPOSITIONS

A base control sample was prepared which contained only nylon, calcined clay, and silane (no sulfonamide). 59.6 parts of nylon 66 having a number average molecular weight of 20,000 was surface coated with 0.60 parts of gamma aminopropyltriethoxysilane, by a tumbling action at ambient temperature. To the surface coated nylon was added 39.8 parts of finely divided calcined clay (aluminum silicate). The mean particle size of the clay was 1.2 micrometers. These ingredients were intermingled by tumbling again and then fed to a 28 millimeter twin screw extruder, at a feed rate of 15 pounds (7 Kg) per hour. The extruder was operated at a barrel temperature of 270° C. to 280° C. and a screw speed of 200 revolutions per minute. The extruder had a vacuum port to remove volatile materials from the molten nylon. The product was quenched in water and chopped into pellets about one-eighth inch (3.2 mm) in length. The product was dried overnight in a vacuum oven at 80° C. and then molded into test specimens on a reciprocating screw machine having a six ounce (180 cm$^3$) capacity. The molding machine was operated at a barrel temperature of 280° C. The mold temperature was 90° C. The screw rotated at 60 revolutions per minute. The machine was set at a cycle of 20 seconds to injection mold and a hold-up time (cooling period) of 20 seconds.

EXAMPLE 1

Control samples A to I were prepared as the Base Control was, except that small amounts of various additives were added individually, to determine whether or not any additives would improve the impact resistance of the respective molded plaques. As described in Table 1, the additives include various anionic, cationic, and nonionic surfactants which were reputed to improve the dispersion of inorganic solids in certain organic systems. Controls A-I are outside the scope of this invention, whereas Example 1 is within the scope of this invention.

In each case, the additive was mixed with the aminofunctional silane prior to blending with the other ingredients, and the procedure for making the Base Control was followed. The impact resistance of the resultant plaques was meaured as reported in Table 2.

Although a number of additives were evaluated, only the N-ethyl, o,p-toluenesulfonamide additive improved the falling-weight impact resistance of the filled nylon-66 composition. These results demonstrate that the sulfonamide is not acting as a mere diluent for the aminofunctional silane, but rather the sulfonamide has a unique function in the composition that the other additives were incapable of contributing.

The physical properties of the Base Control composition and Example 1 were measured (see Table 3). If the sulfonamide additive used in Example 1 were acting as a plasticizer at the low concentrations used herein, the tensile strength and flexural modulus would have been significantly reduced. However, there was no significant change in these physical properties.

TABLE 1

ADDITIVES WHICH WERE ADDED TO THE BASE CONTROL COMPOSITION

| CODE | DESCRIPTION |
|---|---|
| A. | Polyethylene oxide adduct of octylphenol; HLB* value = 14.6; 100% active |
| B. | Polyethylene oxide adduct of tridecyl alcohol; HLB value = 10.5; 95% active |
| C. | Polyethylene oxide adduct of mixed mono- and dioctyl phosphates; HLB value = 6.7; 100% active |
| D. | Mixed mono- and di($C_8$ to $C_{12}$) phosphates; 100% active |
| E. | N,N,N',N'—tetrakis (hydroxypropyl) ethylenediamine dioleate; 95% active |
| F. | 2-ethylcyclohexylamine salt of monolauryl sulfate; 95% active |
| G. | Solution of calcium salts of mixed $C_8$-$C_{12}$ aliphatic carboxylic acids dissolved in mineral spirits; 8.0% calcium content; 50% non-volatile matter (NVM) |
| H. | Solution of zinc salt of neodecanoic acid dissolved in mineral spirits; 16% zinc content; 83% NVM |
| I. | Solution of calcium salt of naphthenic acid dissolved in mineral spirits; 4.0% calcium content and 35% NVM |
| Example 1 | Mixture of N—ethyl ortho-toluenesulfonamide and N—ethyl paratoluenesulfonamide; molecular weight = 199; boiling point = 196° C. at 10 mm Hg. |

*The HLB value is a measure on a scale of 0 to 20 of the balance between hydrophobic and hydrophilic strengths of a given surfactant. The lower the number, the more hydrophobic the surfactant. The higher the number, the more hydrophilic the surfactant.

TABLE 2

MEASUREMENT OF IMPACT RESISTANCE BY FALLING WEIGHT IMPACT TEST G

| MODIFIER FROM TABLE 1 | CONCENTRATION | IMPACT RESISTANCE | |
|---|---|---|---|
| CODE | (parts by weight of composition) | (inch-pounds) | (Joules) |
| Base Control | — | 94 | 10.6 |
| A | 0.66 | 74 | 8.4 |
| A | 1.94 | 85 | 9.6 |
| B | 0.66 | 85 | 9.6 |
| B | 1.94 | 76 | 8.6 |
| C | 0.66 | 79 | 8.9 |
| C | 1.94 | 70 | 7.9 |
| D | 0.66 | 70 | 7.9 |
| E | 0.66 | 78 | 8.8 |
| E | 1.94 | 40 | 4.5 |
| F | 0.64 | 56 | 6.3 |
| G | 1.94 | 65 | 7.4 |
| H | 0.66 | 89 | 10.1 |
| H | 1.94 | 26 | 2.9 |
| I | 0.66 | 87 | 9.8 |
| Example 1 | 0.66 | 128 | 14.5 |

TABLE 3

PHYSICAL PROPERTIES FOR EXAMPLE 1 AND BASE CONTROL

| PROPERTY | UNITS | BASE CONTROL 1 | EXAMPLE 1 |
|---|---|---|---|
| Tensile Strength | | | |
| 73° F., DAM | psi | 13,500 | 13,600 |
| 23° C., DAM | MPa | 93.0 | 93.7 |
| 73° F., 50% RH | psi | 10,100 | 9,840 |
| 23° C., 50% RH | MPa | 69.5 | 67.8 |
| Elongation at Break | | | |
| 73° F. (23° C.), DAM | % | 12 | 14 |
| 73° F., (23° C.) 50% RH | % | 34 | 36 |
| Flexural Modulus | | | |
| 73° F., DAM | psi | 842,000 | 850,000 |
| 23° C., DAM | MPa | 5,810 | 5,865 |
| 73° F., 50% RH | psi | 375,000 | 370,000 |
| 23° C., 50% RH | MPa | 2,590 | 2,550 |

TABLE 3-continued

PHYSICAL PROPERTIES FOR EXAMPLE 1 AND BASE CONTROL

| PROPERTY | UNITS | BASE CONTROL 1 | EXAMPLE 1 |
|---|---|---|---|
| Izod Impact Strength | | | |
| 73° F., DAM | ft lb/in | 1.3 | 1.2 |
| 23° C., DAM | J/m | 69 | 64 |
| 73° F., 50% RH | ft lb/in | 1.7 | 1.5 |
| 23° C., 50% RH | J/m | 91 | 80 |

DAM = Dry as Molded

EXAMPLE 2

This example compares the performance of composition IV below, which is within the scope of the invention described herein, with the performance of compositions I, II, and III, below, which are not within the scope of invention.

| Compositions | I | II | III | IV |
|---|---|---|---|---|
| (Parts by Weight) | | | | |
| Polyamide A | 60.0 | 59.60 | 59.60 | 59.30 |
| Aluminum Silicate B | 40.0 | 39.80 | 39.80 | 39.50 |
| N—ethyl o,p-toluene-sulfonamide | None | 0.60 | None | 0.60 |
| γ-aminopropyltriethoxy-silane | None | None | 0.60 | 0.60 |
| TOTAL | 100.00 | 100.00 | 100.00 | 100.00 |

Polyamide A is poly (hexamethylene adipamide) with a number average molecular weight of 20,000. The water content was measured to be 0.30%. Aluminum silicate B is a finely divided calcined clay with a mean particle size of 1.2 micrometers. The water content was measured to be 0.21%.

In composition I, the two solid components were intermingled with a tumbling action at ambient temperature. Then the blend was extruded on a 28 mm twin screw extruder, cut into cubes, and molded into plaques. In compositions II and III, the liquid component was thoroughly intermingled with polyamide A; then aluminum silicate B was added and the blending step was repeated. Thereafter II and III were extruded and molded in the same manner as I. In composition IV, first the two liquid components were mixed together, and then the combined liquid was used in the same sequence as used with compositions II and III. The molded plaques were placed in vacuum sealed envelopes for 48 hours and then tested for impact resistance.

The following results were obtained on compositions I through IV, by use of falling-weight impact test G:

| Impact Resistance | I | II | III | IV |
|---|---|---|---|---|
| (in-lb) | 32 | 32 | 103 | 128 |
| (Joules) | 3.6 | 3.6 | 11.6 | 14.5 |

These results show that the use of the aminofunctional silane coupling agent improves impact resistance but that additional presence of the sulfonamide imparts even greater impact resistance.

EXAMPLE 3

In this example the compositions were compounded on a single screw extruded, rather than a twin screw extruder. In general, a single screw extruder is less efficient than a twin screw extruder in dispersing mineral filler uniformly into a nylon matrix. This example compares the performance of compositions VI, VIIA and VIIB which are within the scope of the invention described herein, with the performance of composition V, which is not within the scope of the invention. VIIB is a duplicate run of VIIA.

| Composition | V | VI | VIIA | VIIB |
|---|---|---|---|---|
| (Parts by Weight) | | | | |
| Polyamide A | 45.0 | 45.0 | 45.0 | 45.0 |
| Polyamide C | 15.0 | 15.0 | 15.0 | 15.0 |
| Aluminum Silicate B | 40.0 | 40.0 | 40.0 | 40.0 |
| γ-aminopropyl triethoxy-silane | 0.54 | 0.54 | 0.54 | 0.54 |
| N—ethyl o,p-toluene-sulfonamide | None | 0.54 | None | None |
| N—butylbenzenesulfonamide | None | None | 0.54 | 0.54 |

Polyamide C is nylon-6 which contains about 10% unextracted caprolactam and has a number average molecular weight of 22,000. In case VI and VII, the liquid silane and liquid sulfonamide were blended together before use. In each case, the liquid component or components were blended with the polyamides by mechanical tumbling for 10 minutes. Then the aluminum silicate was added, and the tumbling was repeated for 10 minutes. The blends were extruded through a 2.5" diameter single screw extruder at a rate of 100 pounds per hour, cut into cubes, and molded into plaques. The mold plaques were placed in vacuum sealed envelopes for 48 hours and then tested for impact resistance as described in Control 1. The following results were obtained:

| Impact Resistance | V | VI | VIIA | VIIB |
|---|---|---|---|---|
| (in-lb) | 80 | 179 | 197 | 143 |
| (J) | 9.0 | 20.1 | 22.3 | 16.2 |

These results show that the use of sulfonamide plus aminofunctional silane produces a molded object with much higher impact resistance than the use of silane alone, when a single screw extruder is used to compound the composition. The physical properties of these compositions were measured, and the presence of 0.54 parts of sulfonamide did not depress the flexural modulus of compositions VI or VII.

TABLE 4

PHYSICAL PROPERTIES FOR EXAMPLE 3

| PROPERTY | UNITS | COMPOSITION | | | |
|---|---|---|---|---|---|
| | | V | VI | VIIA | VIIB |
| Tensile Strength | | | | | |
| 73° F., DAM | psi | 12,850 | 13,100 | 13,100 | 13,000 |
| 23° C., DAM | MPa | 88.5 | 90.3 | 90.3 | 89.6 |
| Flexural Modulus | | | | | |
| 73° F., DAM | psi | 856,000 | 865,000 | 862,000 | 868,000 |
| 23° C., DAM | MPa | 5,900 | 5,960 | 5,940 | 5,980 |

DAM = Dry as Molded

What is claimed is:

1. A composition consisting essentially of
   (a) about 50 to 80 parts by weight of at least one polyamide having a number average molecular weight of at least 11,000,
   (b) about 20 to 50 parts by weight of at least one mineral filler that is substantially anhydrous and has a mean average particle size of 2.0 micrometers or less,
(c) about 0.2 to 0.9 parts by weight of at least one aminofunctional silane, and
(d) about 0.2 to 0.9 parts by weight of at least one N-substituted hydrocarbyl sulfonamide.

2. The composition of claim 1 wherein the polyamide is a condensation product of a saturated aliphatic dicarboxylic acid of 4–12 carbons and a saturated aliphatic diamine of 4–14 carbons.

3. The composition of claim 1 wherein the polyamide is polyhexamethylene adipamide.

4. The composition of claim 1 wherein the polyamide is a mixture of poly(caprolactam) and polyhexamethylene adipamide.

5. The composition of claims 1, 2, 3 or 4 wherein the mineral filler is selected from calcined clay, wollastonite or talc.

6. The composition of claims, 1, 2, 3 or 4 wherein the aminofunctional silane is an amino-(lower alkyl)tri(lower alkoxy) silane.

7. The composition of claim 5 wherein the aminofunctional silane is an amino-(lower alkyl)tri(lower alkoxy) silane.

8. The composition of claim 1 wherein the N-substituted hydrocarbyl sulfonamide has the formula

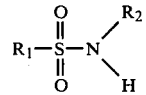

wherein $R_1$ is aryl of 6–10 carbons and $R_2$ is alkyl of 1–6 carbons.

9. The composition of claim 5 wherein the N-substituted hydrocarbyl sulfonamide has the formula

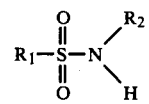

wherein $R_1$ is aryl of 6–10 carbons and $R_2$ is alkyl of 1–6 carbons.

10. The composition of claim 6 wherein the N-substituted hydrocarbyl sulfonamide has the formula

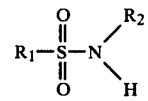

wherein $R_1$ is aryl of 6–10 carbons and $R_2$ is alkyl of 1–6 carbons.

11. The composition of claim 7 wherein the N-substituted hydrocarbyl sulfonamide has the formula

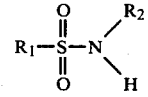

wherein $R_1$ is aryl of 6–10 carbons and $R_2$ is alkyl of 1–6 carbons.

* * * * *